United States Patent [19]

Kataoka et al.

[11] Patent Number: 4,561,717
[45] Date of Patent: Dec. 31, 1985

[54] OPTICAL SYSTEM FOR INFORMATION PROCESSING

[75] Inventors: Keiji Kataoka, Kawagoe; Susumu Saito, Hachioji; Akira Arimoto, Musashimurayama; Akira Hashimoto, Ome; Kimio Tatsuno, Kokubunji, all of Japan

[73] Assignees: Hitachi, Ltd.; Hitachi Koki Co, Ltd., both of Tokyo, Japan

[21] Appl. No.: 261,760

[22] Filed: May 8, 1981

[30] Foreign Application Priority Data

May 16, 1980 [JP] Japan .................. 55-63942
Apr. 1, 1981 [JP] Japan .............. 56-45424 [U]

[51] Int. Cl.⁴ .............................................. G02B 27/17
[52] U.S. Cl. .................................................. 350/6.8
[58] Field of Search ........................................ 350/6.8

[56] References Cited

U.S. PATENT DOCUMENTS

| | | | |
|---|---|---|---|
| 3,573,849 | 4/1971 | Herriot et al. | 350/6.8 |
| 3,928,759 | 12/1975 | Sansone | 350/6.8 |
| 3,947,816 | 3/1976 | Rabedeau | 350/6.8 |
| 3,973,833 | 8/1976 | Lawson | 350/6.8 |
| 4,213,157 | 7/1980 | DeBenedictis et al. | 350/6.8 |

FOREIGN PATENT DOCUMENTS 2724181 1/1978 Fed. Rep. of Germany.
2802417 7/1978 Fed. Rep. of Germany.

OTHER PUBLICATIONS

Belleson, "Scanning Method Employing Multiple Spots Per Field," IBM Technical Disclosure Bulletin, 10/1972, pp.1479-1480.

Primary Examiner—John K. Corbin
Assistant Examiner—Rebecca D. Gass
Attorney, Agent, or Firm—Antonelli, Terry & Wands

[57] ABSTRACT

An optical system provided with a single optical scanner for separating a plurality of laser beams from each other and for leading the separated laser beams to different recording materials to record information thereon is disclosed in which cylindrical lenses are provided in front of the recording materials in such a manner that a predetermined number of ones among the laser beams pass through the cylindrical lenses, respectively.

6 Claims, 11 Drawing Figures

OPTICAL SYSTEM FOR INFORMATION PROCESSING

BACKGROUND OF THE INVENTION

1. FIELD OF THE INVENTION

The present invention relates to an optical system for information processing, and more particularly to an optical system for modulating each of a plurality of laser beams independently and for recording information on different areas of a recording material optically and simultaneously by means of the modulated laser beams.

2. DESCRIPTION OF THE PRIOR ART

When it is desired to effect laser recording on different recording materials independently and simultaneously, there has been employed, for example, a laser printer system such as shown in FIG. 1 of the accompanying drawings, in which a pair of laser beams 1 and 2 are light-modulated independently for effecting laser recording on different areas of a recording material 9. Referring to FIG. 1, each of rotating polygonal mirrors 3 and 4 is used to deflect the laser beam 1 or 2 for effecting scanning with the laser beams. Further, each of lenses 5 and 6 is the so-called F-$\theta$ lens and is used to convert each laser beam into a fine scanning spot on the recording material 9. The recording material is moved in the direction indicated by arrows, and therefore the laser recording can be effected all over the surface of the recording material 9.

In such an optical system for laser printer as shown in FIG. 1, however, both the number of rotating polygonal mirrors and the number of F-$\theta$ lenses are required to be equal to the number of independent laser recording. Accordingly, the optical system shown in FIG. 1 is large in size, complicated in structure, and expensive.

SUMMARY OF THE INVENTION

An object of the present invention is to provide an optical system for information recording which is small in size, simple in structure, and inexpensive.

According to the present invention which can attain the above object, there is provided an optical system in which a plurality of laser beams each scanning the surface of a recording material are formed by means of a single optical scanner and at least one focussing lens, and in which cylindrical lenses are provided in front of the recording material so that a predetermined number of laser beams selected from the above-mentioned laser beams can pass through the cylindrical lenses, respectively.

DESCRIPTION OF THE PREFERRED EMBODIMENTS

In order that a plurality of laser beams emerging from a single optical scanner are led respectively to different recording surfaces, the laser beams are required to be spatially separated from each other after having passed through a focussing lens. Accordingly, the laser beams must impinge upon the focussing lens at different angles of incidence.

Now, explanation will be made on the distortion of a scanning line which appears on the recording surface in the above case, with reference to FIG. 2.

Figure 1:
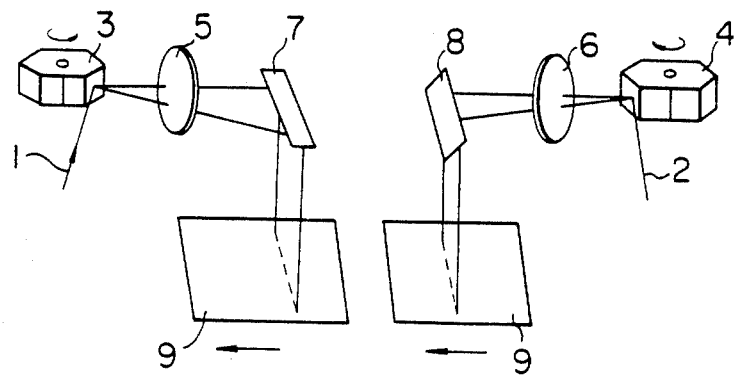
FIG. 1 is a diagram for explaining a conventional optical system.
Figure 2:
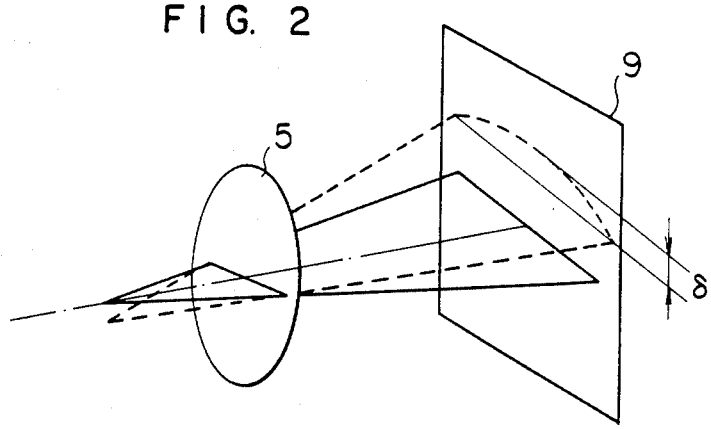
FIG. 2 is a diagram for explaining the distortion of a scanning line.

FIG. 2 shows a system in which two laser beams are employed to effect a laser recording. Referring to FIG. 2, two scanning laser beams which emerge from an optical scanner and are indicated by solid lines and broken lines, respectively, are incident at different angles upon an F-$\theta$ lens 5, that is, a focussing lens. Accordingly, a light scanning plane that the scanning laser beam indicated by the solid lines makes, contains therein the optical axis (indicated by a dot-dash line) of the F-$\theta$ lens, but a light scanning plane that the laser beam indicated by the broken lines makes, does not contain therein the above-mentioned optical axis. Therefore, the laser beam which is indicated by the broken lines and incident upon the F-$\theta$ lens obliquely, forms on a recording surface 9 a distorted scanning line such as indicated by $\delta$ in FIG. 2.

The distorted scanning line is formed not only in a case where the focussing lens is placed between the optical scanner and the recording surface, but also in a case where the focussing lens is placed between a laser source and the optical scanner. In the latter case, the distorted scanning line is formed because two laser beams are incident upon the optical scanner in two directions either of which are at least oblique with respect to the optical axis of the focussing lens.

Figure 3A:
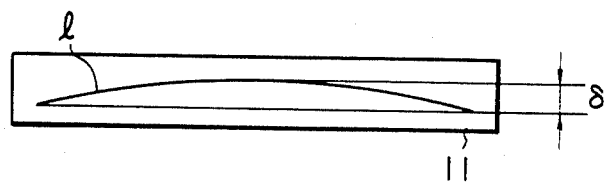
FIGS. 3a and 3b are diagrams for explaining the principle of the present invention.
Figure 3B:
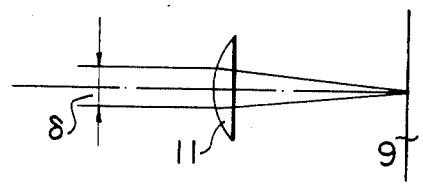

In order to correct the distorted scanning line, according to the present invention, a cylindrical lens is provided in front of the recording surface 9. Now, explanation will be made on the reason why the distorted scanning line can be corrected by the cylindrical lens, with reference to FIGS. 3a and 3b. FIG. 3a is a view of the cylindrical lens when it is viewed in the incident direction of the laser beam, and FIG. 3b is a view of the cylindrical lens when it is viewed from the side thereof. In FIG. 3a, reference symbol 1 designates a distorted scanning laser beam incident upon a cylindrical lens 11, which is placed in front of the recording surface 9. Referring to FIG. 3b, the distance between the cylindrical lens 11 and the recording surface 9 is made equal to the focal length of the cylindrical lens. The scanning laser beam 1 incident upon the cylindrical lens 11, which laser beam has a distortion δ, is focussed on the recording surface 9 at the point of intersection of the optical axis of the cylindrical lens 11 and the recording surface, as shown in FIG. 3b, since the focal point of the cylindrical lens lies in the recording surface 9. Thus, a scanning line having no distortion can be formed on the recording surface.

Figure 4:
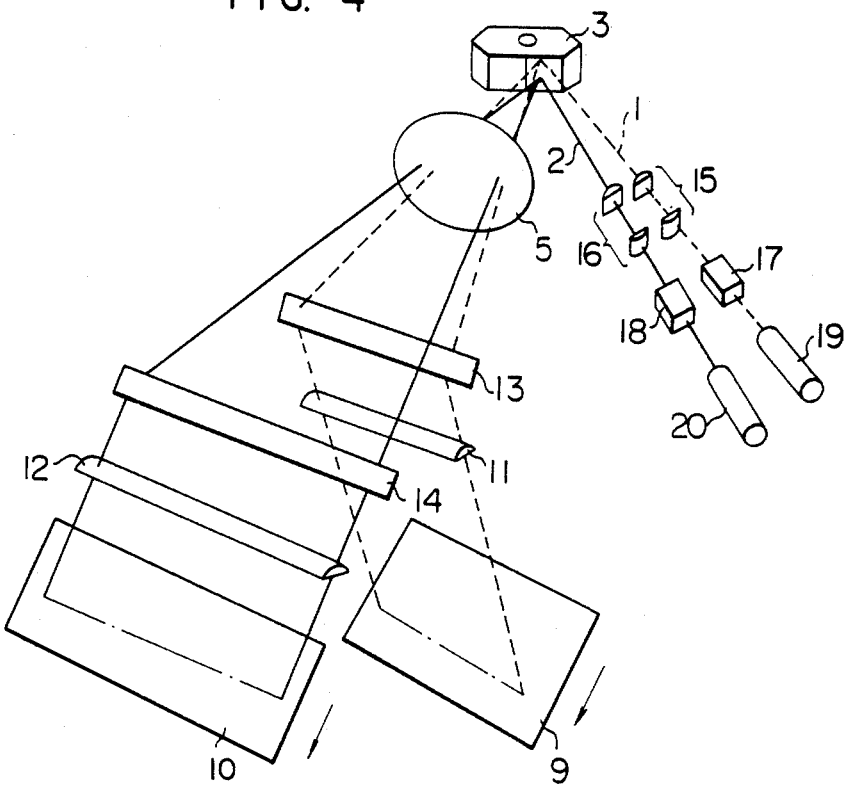
FIG. 4 is a diagram for showing the construction of an embodiment of an optical system according to the present invention.
Figure 5:
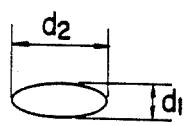
FIG. 5 is a diagram for explaining the intensity distribution of a laser beam employed in the present invention.

FIG. 4 shows a case where an optical system according to the present invention is applied to a laser printer and only two laser beams are employed. In FIG. 4, reference numerals 19 and 20 designate laser sources (for example, gas lasers), 17 and 18 light-modulators each for modulating a laser beam, and 15 and 16 one-directional beam expanders each formed of a combination of cylindrical lenses. When laser beams 1 and 2 emerging respectively from the one-directional beam expanders 15 and 16 impinge upon a rotating polygonal mirror 3, the cross-sectional pattern of each laser beam is given by such an elliptical shape having minor and major axes $d_1$ and $d_2$ as shown in FIG. 5. Further, reference numeral 5 designates an F-θ lens which is a focussing lens. Two scanning laser beams emerging from the rotating polygonal mirror 3 (that is, two scanning planes) impinge upon the F-θ lens 5 at different angles of incidence so that the scanning laser beams can be spatially separated by mirrors 13 and 14 after having emerged from the F-θ lens 5. Cylindrical lenses 11 and 12 are employed to form on the recording surfaces 9 and 10 scanning lines having no distortion. Each of the recording surfaces 9 and 10 is moved in the direction of the arrow, which permits the optical recording at the entire area of the recording surface.

Next, explanation will be made on the reason why the laser beams 1 and 2 have such an elliptical cross section as shown in FIG. 5 when they impinge upon the rotating polygonal mirror 3. Each of the cylindrical lens 11 and 12 has no curvature in the direction parallel to the major axis $d_2$ of the elliptical cross section, and therefore cannot focus the laser beam on the recording surface with respect to this direction. Accordingly, the major axis $d_2$ of the laser beam is focussed on the recording surface only with the F-θ lens 5. On the other hand, owing to the diffraction, it is not possible to focus the minor axis $d_1$ of the laser beam on the recording surface only with the F-θ lens 5. The minor axis $d_1$ is focussed with each of the cylindrical lenses 11 and 12. As a result, the laser beam can be focussed on the recording surface in both directions, that is, in the directions of major and minor axes.

Figure 6:
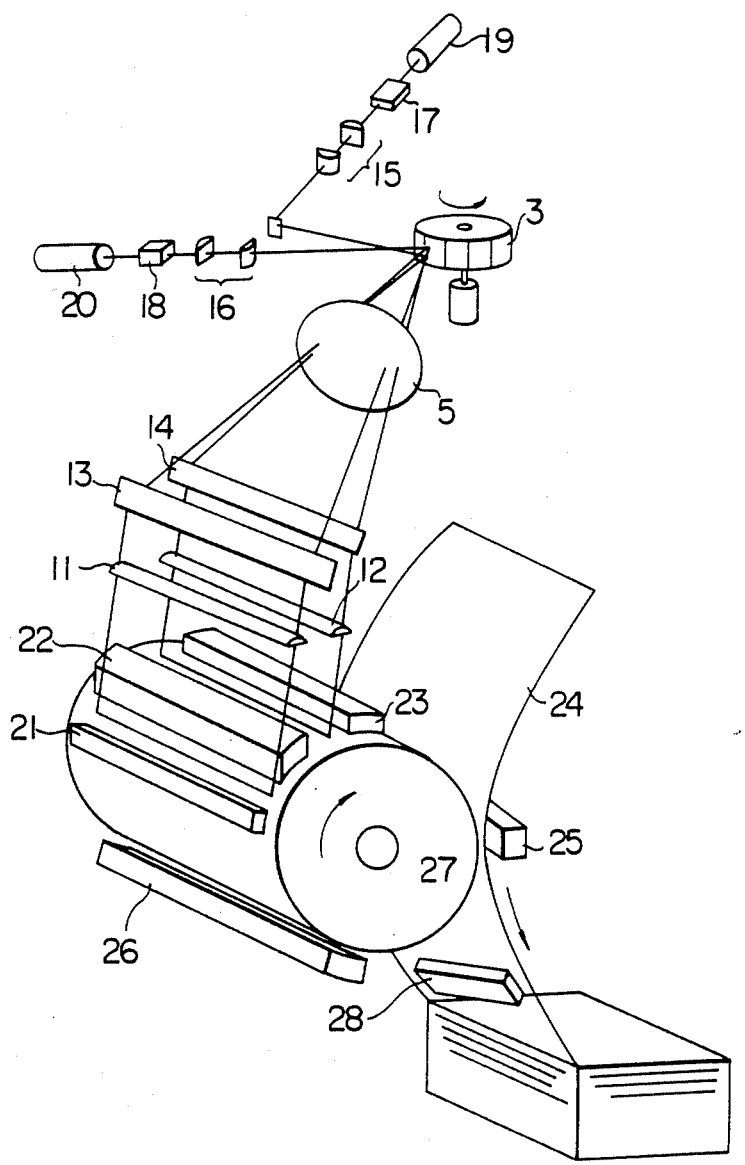
FIG. 6 is a diagram showing a case where the optical system shown in FIG. 4 is employed in a multi-color laser printer.

FIG. 6 shows a case where an optical system according to the present invention is applied to a laser printer for multi-color printing and only two laser beams are employed. Referring to FIG. 6, two laser beams scan different areas of a recording material 27, which is called a photoconductive drum. Light information stored on the photoconductive drum is transferred to a plain paper 24 through the well-known electrophotographic process. In more detail, two-color letters can be printed on the plain paper 24, using a charging unit 21, a developing unit 22 for, for example, red toners and another developing unit 23 for, for example, black toners. Incidentally, in FIG. 6, reference numeral 25 designates a transfer unit, 26 a cleaning unit, and 28 a fixing unit.

Figure 7:
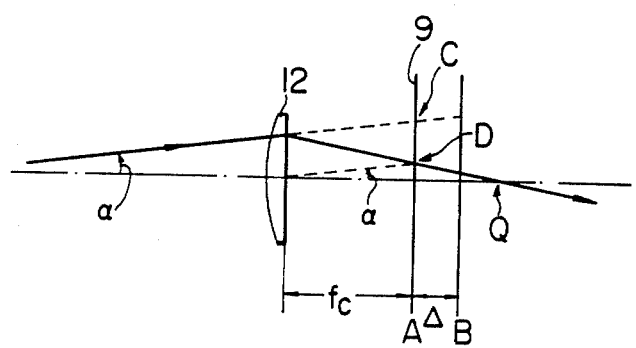
FIG. 7 is a diagram for explaining another arrangement of an optical system according to the present invention.

In the foregoing description, explanation has been made on the cases where the laser beam incident upon the cylindrical lens, as shown in FIG. 3b, is made parallel to the optical axis of the cylindrical lens when viewed from the side of the cylindrical lens. However, in the case where the laser beam, as shown in FIG. 7, is incident at an angle α upon the cylindrical lens 12 when viewed from the side of the cylindrical lens 12, the recording surface 9 is placed in a plane B shown in FIG. 7. In more detail, when the recording surface 9 is placed in a plane A, that is, when the distance between the cylindrical lens 12 and the recording surface 9 is equal to the focal length $f_c$ of the cylindrical lens 12, the laser beam impinges upon the recording surface 9 at a position C or D according as the cylindrical lens 12 is absent or present. In other words, owing to the presence of the cylindrical lens 12, the distortion of scanning line is reduced.

As is evident from FIG. 7, the distortion of the scanning line is further reduced by moving the recording surface 9 from the plane A to the plane B. When the recording surface 9 is moved to a point Q, the distortion of the scanning line is completely corrected and therefore a straight scanning line can be formed.

In the foregoing description, there has been shown the cases where a gas laser is employed as a laser source. In the present invention, however, the gas laser may be replaced by a semiconductor laser. Specifically, a semiconductor laser array having a plurality of laser emitting regions, which are arranged one-dimensionally, is advantageous in that the optical system can be simplified.

Figure 8:
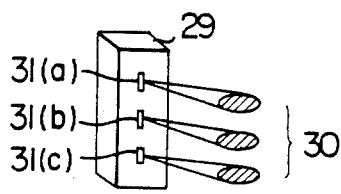
FIG. 8 is a diagram showing a semiconductor laser array.

FIG. 8 shows a semiconductor laser array 29 having three laser emitting regions 31(a), 31(b) and 31(c). The laser beams emitted from the semiconductor laser array usually have such elliptical laser radiation patterns as indicated by reference numeral 30.

Figure 9:
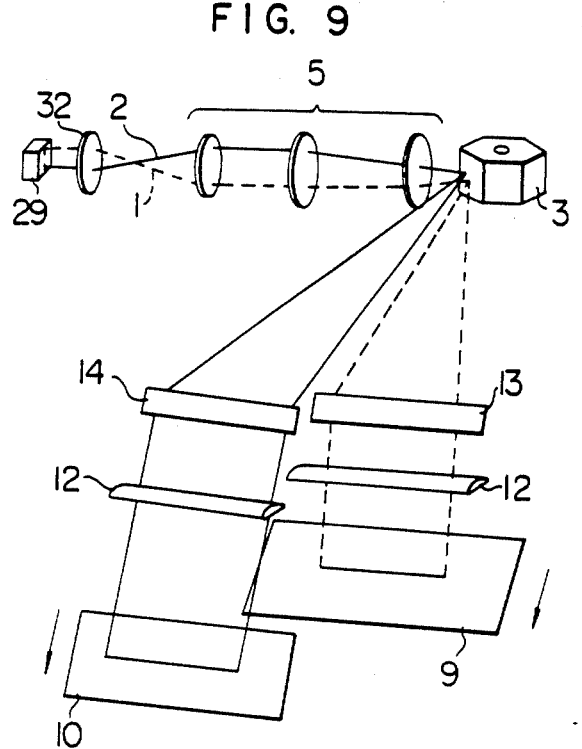
FIG. 9 is a diagram for showing another embodiment of an optical system according to the present invention in which a semiconductor laser array is employed.

FIG. 9 shows a laser printer, which is different from the printer shown in FIG. 4 in that the optical system includes a semiconductor laser array 29 having two laser emitting regions. In FIG. 9, reference numeral 32 designates a coupling lens for effectively converting the laser beam emitted from the array 29 into a parallel light beam, and 5 a focussing lens. Incidentally, FIG. 9 shows the case where the focussing lens 5 is placed between the semiconductor laser array 29 and the rotating polygonal mirror 3.

Referring to FIG. 9, each of two laser beams incident upon the focussing lens 5 has such an elliptical cross section as shown in FIG. 5. This is because the laser beam emitted from a semiconductor laser is elliptical in cross section, as shown in FIG. 8. The laser beam having such an elliptical cross section is focussed on the recording surface 9 or 10 with the focussing lens 5 and cylindrical lens 12, so as to form a circular spot.

Figure 10:
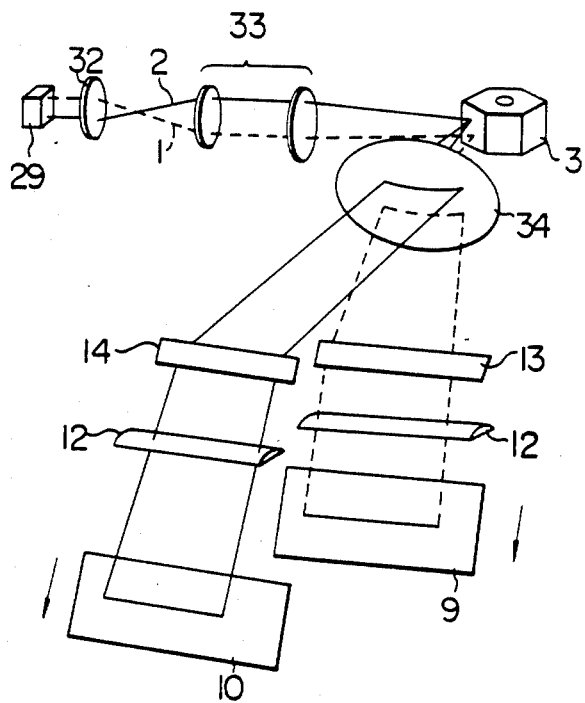
FIG. 10 is a diagram for showing a further embodiment of an optical system according to the present invention in which a semiconductor laser array and an F-$\theta$ lens are employed.

In the laser printer shown in FIG. 9, only one focussing lens 5 is provided, but two or more or the same number of focussing lenses 5 as that of the light emitting regions may be provided in respective light paths between the laser emitting regions of the laser array 29 and the scanner 3. Further in FIG. 9, though the focussing lens 5 is placed between the laser source and the optical scanner (namely, the rotating polygonal mirror), the focussing lens may be placed between the optical scanner and the recording surface. In this case, the so-called F-θ lens can be used as the focussing lens. FIG. 10 shows the case where an F-θ lens 34 is employed in the optical system shown in FIG. 9. Referring to FIG. 10, a lens system 33 is used to convert each of parallel light beams 1 and 2 having a beam width into a parallel light beam having another beam width. The laser beams emerging from the F-θ lens 34 are spatially separated from each other by mirrors 13 and 14, and then scan the recording surfaces 9 and 10, respectively. The cylindrical lenses 12 are placed in front of the recording surfaces 9 and 10 for the previously-mentioned purpose.

In the foregoing description, explanation has been made on the cases where only two laser beams are employed. The present invention is not limited to these cases, but is applicable to the case where three or more laser beams are employed. It is needless to say that the present invention is also applicable to the case where a required number of ones among a plurality of laser beams, for example, only three laser beams are incident upon a focussing lens at respective angles, which are different from each other.

We claim:

1. An optical system for information recording comprising:
    a single optical scanner for deflecting a plurality of laser beams which are incident thereon at different angles so as to scan different areas of a recording material;
    at least one focussing lens for focussing said laser beams on said recording material; and
    cylindrical lenses provided in front of said recording material, a respective cylindrical lens being provided in the optical path of each of at least a predetermined number of scanning laser beams emerging from said single optical scanner so that at least the predetermined number of scanning laser beams pass through said cylindrical lenses, respectively, to reach said recording material.

2. An optical system for information recording according to claim 1, wherein said focussing lens is an F-θ lens.

3. An optical system for information recording according to claim 1, wherein a semiconductor laser array having a plurality of laser emitting regions, which are arranged one-dimensionally, is used to emit said laser beams.

4. An optical system according to claim 1, further comprising optical guiding means arranged to spatially separate said laser beams deflected by said single optical scanner and to guide the separated laser beams to said different areas of said recording material.

5. An optical system according to claim 1, wherein said recording material is a photoconductive recording medium, and further comprising a plurality of developing means associated with said photoconductive recording medium for enabling a multi-color printing.

6. An optical system according to claim 1, wherein said plurality of laser beams impinging on said single optical scanner have an elliptical cross-section.

* * * * *